No. 681,427. Patented Aug. 27, 1901.
E. M. ALEXANDER.
CORN PLANTER.
(Application filed June 11, 1901.)
(No Model.)

Witnesses.
H. F. Meyer Jr.
F. S. Stitt.

Inventor.
Edwin M. Alexander
By Chas. B. Mann
Attorney.

UNITED STATES PATENT OFFICE.

EDWIN M. ALEXANDER, OF SYKESVILLE, MARYLAND.

CORN-PLANTER.

SPECIFICATION forming part of Letters Patent No. 681,427, dated August 27, 1901.

Application filed June 11, 1901. Serial No. 64,078. (No model.)

*To all whom it may concern:*

Be it known that I, EDWIN M. ALEXANDER, a citizen of the United States, residing at Sykesville, in the county of Carroll and State of Maryland, have invented certain new and useful Improvements in Corn-Planters, of which the following is a specification.

This invention relates to check-row corn-planters; and its object is to provide an improved corn-planter of this character whose construction does away with the necessity of a check-wire for marking the hills into which the corn has been dropped and which is provided with improved mechanism for intermittently actuating the "second drop" of the machine.

The invention consists in certain constructions, arrangements, and combinations of the parts hereinafter fully described and claimed, reference being had to the accompanying drawings, in which—

Figure 1:
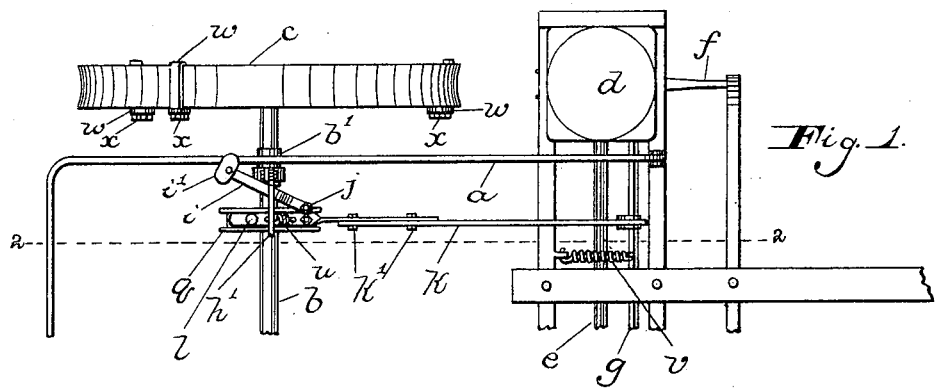
Figure 2:
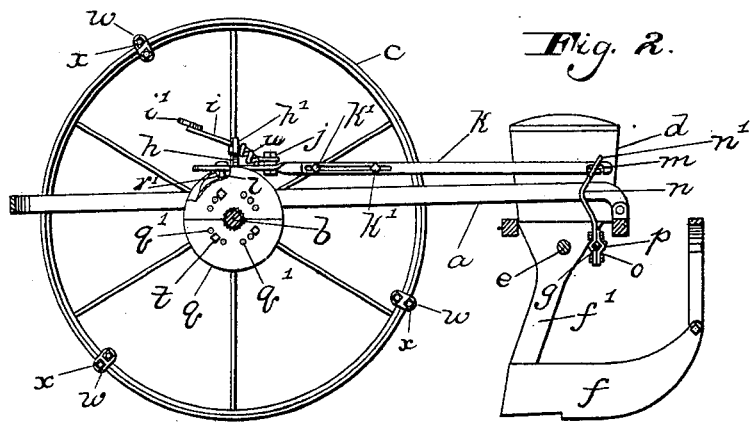
Figure 3:
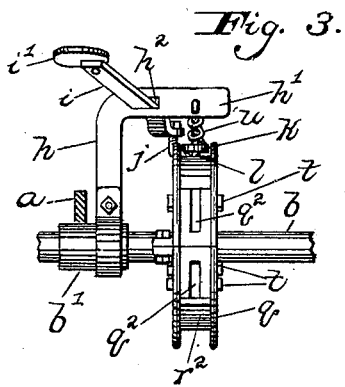
Figure 5:
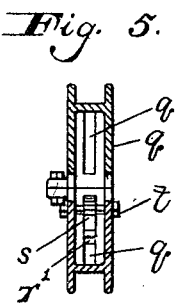
Figure 4:
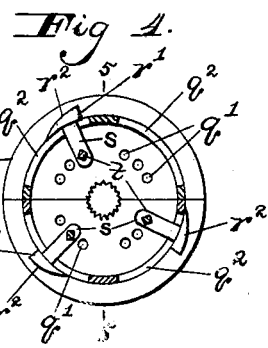

Figure 1 is a plan view of a portion of a check-row corn-planter embodying the principles of the invention, only so much of the planter being shown as is necessary to illustrate the invention. Fig. 2 is a vertical longitudinal section of the same on the line 2 2 of Fig. 1. Fig. 3 is an enlarged detail rear view of the intermittent drop-actuating mechanism. Fig. 4 is a detail sectional view of the actuating cam-wheel. Fig. 5 is a diametrical section of the same on the line 5 5 of Fig. 4.

The corn-planter, a portion of which is illustrated in the accompanying drawings, is what is known as a "two-drop" machine. In this class of planter a quantity of seed-corn is placed in hoppers provided at their bottoms with continuously-rotating horizontal feed-plates in which are formed a number of pockets for the corn. As said plates rotate the pockets pass under a "cut-off" and drop their corn into the tubular legs of shoes which open the ground for the reception of the corn and which are provided at their heels with valves which retain the said corn in the said legs. The operation just described constitutes the "first drop."

The valves just mentioned are intermittently opened by a rocking shaft operatively connected therewith, and thus the corn is allowed to drop from the legs of the shoes into spaced-apart "hills." This constitutes the "second drop."

Referring to the drawings, the letter $a$ designates a portion of the framework of a corn-planter of the type just described. Said framework is mounted on a rotating axle $b$, to which is rigidly secured traveling wheels, one of which is shown at $c$. The letter $d$ designates one of the corn-hoppers mounted on said framework. Under the hoppers extends a shaft $e$, arranged to continuously rotate the feed-plates of the hoppers and is itself driven by suitable gearing (not shown) connecting it to the axle $b$.

The letter $f$ designates one of the furrow-opening shoes whose leg $f'$ receives the corn from the hoppers, and $g$ designates a horizontal rock-shaft mounted in suitable hangers on the framework $a$ and underneath said hoppers, as shown best in Fig. 2, and suitably connected with valves at the heels of the shoes.

The parts hereinbefore described form no part of the present invention, but are enumerated for the purpose of describing the improved second-drop-actuating mechanism and hill-marking attachment, which will be now described.

Rigidly secured to some stationary part of the framework $a$, in this instance to one of the journal-bearings $b'$ of the rotating axle $b$, is a vertical post $h$, whose upper end $h'$ extends horizontally over the axle $b$ and is provided with a slot $h^2$, as best seen in Fig. 3. An approximately horizontal lever $i$ is loosely mounted in said slot and is thereby arranged to slide in a direction toward the front and rear of the planter and is also capable of rocking in a vertical plane, with the said slotted post $h$ as a fulcrum. To the rear end of said lever $i$ is secured a foot-plate $i'$, by which the said lever may be rocked, and to the forward end of the lever is pivotally secured a bracket $j$, which carries a horizontal reciprocating rod $k$. This rod extends both forwardly and rearwardly from its supporting-bracket $j$. Its rear end is provided with a downwardly-projecting lug $l$, for a purpose presently described, and its forward end is provided with a downwardly-opening bayonet-slot $m$, in which is detachably received the upper forked and slotted end $n'$ of an arm $n$, rigidly secured to the rock-shaft $g$ by means of a metal strap $o$, bolted thereto, and also by means of a clamp-screw $p$, working through said strap. If the rock-shaft $g$ is square in cross-section, the strap $o$ will be sufficient to hold the said arm rigidly on the same, because the strap and lower end of the arm are both angular, as shown; but if the rock-shaft is round it will be necessary to bind the clamp-screw $p$ against said shaft. As shown best in Fig. 2, the reciprocating rod $k$ is preferably constructed in two sections extensibly connected together by bolts $k'$, working through the overlapped slotted ends of the said sections. By this means the rod may be made longer or shorter, so as to compensate for the varying distances between the rock-shafts and axles of different machines.

Rigidly clamped on the axle $b$, just underneath the rear end of the reciprocating rod $k$, is a hollow cam-wheel $q$, made in two parts and provided in each side with a plurality of transverse bolt-holes $q'$ and also provided in its periphery with longitudinal slots $q^2$, as best seen in Figs. 3, 4, and 5. A number of cams (in this instance three) are provided with shoulders $r'$ and upper surfaces $r^2$, sloping from said shoulders, and said cams are seated on the periphery of the wheel $q$ and have shanks $s$, which extend through the peripheral slots $q^2$ into the cam-wheel. The said shanks are apertured to receive bolts $t$, which pass therethrough and through the bolt-holes $q'$, whereby to hold the several cams on the wheel $q$. The heads of the cams are broader than the shanks and slots $q^2$, and said heads bind against the periphery of the cam-wheel and are thus held rigidly on the same. When the corn-planter is driven forwardly, the cam-wheel $q$ will rotate with the axle $b$ and will cause the cam-shoulders $r'$ to successively and intermittently engage the lug $l$ and push forwardly the reciprocating rod $k$, which, as is evident, will rock the shaft $g$, so as to open the valves of the shoes $f$ and allow the corn to drop at intervals into the hills. As one cam passes and frees the lug $l$ of the rod $k$ the latter is pulled back by a compression-spring $u$, secured to the rod and to the horizontally-extending upper end $h'$ of the rigid post $h$, thereby bringing the lug $l$ in position for action by the next cam, and the ordinary spring $v$, (see Fig. 1,) which is commonly used to bring the rock-shaft $g$ back to its normal position after it is rocked, assists the rod-spring $u$ and prevents the forward end of the rod $k$ from becoming disengaged from the shaft-arm $n$.

In order to mark the hills into which the corn has been dropped, I have provided a number of markers comprising U-shaped bands $w$, rigidly but detachably secured to the rims of the traveling wheels by means of bolts $x$. The number of markers employed is equal to the number of cams, and the markers are so arranged around the rims of the wheels that they will come into contact with the ground just where the corn has been dropped. It is manifest that the intervals at which the corn is dropped may be varied by attaching different numbers of cams on the cam-wheel $q$. When the planter has reached the end of a row and is turned to commence another row, the driver may press upon the foot-plate $i'$, which will rock the lever $i$ and raise the rod $k$ out of contact with the cam-wheel $q$ until the machine is in position to start the new row.

Having thus described my invention, what I claim as new, and desire to secure by Letters Patent, is—

1. In a corn-planter, mechanism for intermittently dropping the corn, comprising a rigid post; a lever having a sliding fulcrum on said post; a reciprocating rod pivotally connected to said lever, said rod being connected at its forward end to the drop-actuating rock-shaft of the planter, and provided at its rear end with a lug; and a rotating cam-wheel provided with one or more cams arranged to strike said lug to move said rod whereby to rock said shaft.

2. In a corn-planter, the combination with the corn-dropping parts, including a rotating axle and a rock-shaft, of a rigid post; a lever supported on said post so as to slide and rock thereon; a rod pivotally connected between its ends to said lever and supported by the latter; an arm rigidly connected to said rock-shaft and also connected to the forward end of said rod; a cam-wheel rigidly secured to the rotating axle and provided with one or more cams adapted to push said rod forwardly to rock said shaft; and a spring secured to said post and also to said rod, whereby to pull said rod rearwardly.

3. In a corn-planter, the combination with the drop-actuating rock-shaft and the rotating axle, of a vertical post rigidly secured to a stationary part of the planter and extending above the axle, and provided with a slot; a lever loosely mounted in said slot, whereby it is capable of sliding in a direction toward the front and rear of the planter and is also capable of rocking in a vertical plane; a rod supported between its ends by said lever and having its forward end operatively connected to said rock-shaft; and a cam-wheel rigidly secured to the axle and adapted to push on the rear end of said rod whereby to rock said shaft.

4. In a corn-planter, the combination with the drop-actuating rock-shaft and the rotating axle, of a rigid vertical post whose upper end extends horizontally over said axle and is provided with a slot; a lever mounted loosely in said slot and provided at its rear end with a foot-plate by which that end of the lever may be depressed and the forward end thereof raised; a rod pivotally connected to and supported by said lever, said rod being provided at its rear end with a downwardly-projecting lug, and provided at its forward end with a bayonet-slot; an upwardlyextending arm rigidly secured to said rock-shaft and provided with a forked and slotted upper end detachably received in the said bayonet-slot; and a cam-wheel rigidly secured on the axle and underneath the rear end of said rod, and provided with one or more cams adapted to strike said lug whereby to push said rod forwardly.

5. In a corn-planter, the combination with the drop-actuating rock-shaft and the rotating axle, of a reciprocating rod having its forward end operatively connected to said rock-shaft; and a cam-wheel rigidly secured to the axle and provided with a plurality of cams detachably secured to said wheel and adapted to engage the rear end of said rod whereby to push the latter.

6. In a corn-planter, the combination with the drop-actuating rock-shaft and the rotating axle, of a reciprocating rod having its forward end operatively connected to said rock-shaft; a cam-wheel rigidly secured to said axle and provided in its periphery with a plurality of longitudinal slots, and also provided, in its sides, with a plurality of transverse bolt-holes; one or more cams provided with apertured shanks inserted through said slots into the wheel; and bolts passed through said bolt-holes and said shanks, whereby to hold said cams on said wheel.

7. In a corn-planter, mechanism for intermittently dropping the corn, comprising a sliding and rocking foot-lever; a rod pivotally connected to said lever, said rod being also connected to the drop-actuating rock-shaft of the planter, and provided with a lug; and a rotating cam-wheel provided with one or more cams adapted to strike said lug to move the rod and lever, as and for the purpose set forth.

In testimony whereof I affix my signature in the presence of two witnesses.

EDWIN M. ALEXANDER.

Witnesses:
HARRY F. CURLEY,
ROBT. W. CARTER.